US012399399B2

(12) United States Patent
Greco

(10) Patent No.: US 12,399,399 B2
(45) Date of Patent: Aug. 26, 2025

(54) DEVICE FOR A LIQUID CRYSTAL DISPLAY AND LIQUID CRYSTAL DISPLAY

(71) Applicant: Sony Group Corporation, Tokyo (JP)

(72) Inventor: Tonino Greco, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 271 days.

(21) Appl. No.: 17/694,705

(22) Filed: Mar. 15, 2022

(65) Prior Publication Data
US 2022/0299824 A1    Sep. 22, 2022

(30) Foreign Application Priority Data
Mar. 22, 2021    (EP) .................................... 21164021

(51) Int. Cl.
G02F 1/1335    (2006.01)
F21V 8/00    (2006.01)
G02F 1/13357    (2006.01)
G02F 1/1368    (2006.01)

(52) U.S. Cl.
CPC ..... G02F 1/133614 (2021.01); G02B 6/0066 (2013.01); G02F 1/133621 (2013.01); G02F 1/133602 (2013.01); G02F 1/13362 (2013.01); G02F 1/1368 (2013.01); G02F 2202/36 (2013.01)

(58) Field of Classification Search
CPC ......... G02F 1/133614; G02F 1/133621; G02B 6/0066
See application file for complete search history.

(56) References Cited

U.S. PATENT DOCUMENTS

| | | | |
|---|---|---|---|
| 2009/0022446 A1* | 1/2009 | Hoshi | G02F 1/025 385/3 |
| 2010/0053970 A1 | 3/2010 | Sato | |
| 2010/0315570 A1* | 12/2010 | Mathew | G06F 1/1637 257/E27.111 |
| 2018/0067362 A1 | 3/2018 | Lee et al. | |
| 2018/0149914 A1* | 5/2018 | Lee | G02F 1/133615 |
| 2018/0292713 A1* | 10/2018 | Drolet | G02F 1/133621 |
| 2019/0391319 A1* | 12/2019 | Dubrow | G02B 6/0073 |
| 2020/0017762 A1 | 1/2020 | Mansei et al. | |
| 2021/0149227 A1* | 5/2021 | Lee | G02B 6/12 |

FOREIGN PATENT DOCUMENTS

EP    3599541 A1    1/2020
KR    20120009740 A    2/2012

OTHER PUBLICATIONS

Shim, "Colloidal Nanorod Heterostructures for Photovoltaics and Optoelectronics", Journal of Physics D: Applied Physics, vol. 50, 173002, 2017, pp. 1-18.

* cited by examiner

Primary Examiner — Lucy P Chien
(74) Attorney, Agent, or Firm — XSENSUS, LLP

(57) ABSTRACT

The present disclosure generally pertains to a device for a liquid crystal display, including:
a light directing portion for guiding light of a first wavelength range from a light source to a plurality of quantum dots, wherein the light directing portion includes a light directing branching; and
the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

20 Claims, 6 Drawing Sheets

DEVICE FOR A LIQUID CRYSTAL DISPLAY AND LIQUID CRYSTAL DISPLAY

CROSS-REFERENCE TO RELATED APPLICATION

The present application claims priority to European Patent Application No. 21164021.4, filed Mar. 22, 2021, the entire contents of which are incorporated herein by reference.

TECHNICAL FIELD

The present disclosure generally pertains to a device for a liquid crystal display and a liquid crystal display.

TECHNICAL BACKGROUND

Generally, liquid crystal displays (LCDs) are known. Known LCDs may contain a backlight unit which is needed to provide a liquid crystal (LC) panel with uniform planar and polarized white light.

In other devices, a backlight unit may have green, red and blue laser diodes in the backlight unit wherein the red, green, or blue light may be routed to each individual (sub-)pixel, for example by a waveguide, which may be inscribed directly into a glass substrate of a backlight unit.

Although there exist techniques for making an LCD more efficient, it is generally desirable to provide a device for an LCD and an LCD.

SUMMARY

According to a first aspect, the disclosure provides a device for a liquid crystal display, comprising:
  a light directing portion for guiding light of a first wavelength range from a light source to a plurality of quantum dots, wherein the light directing portion includes a light directing branching; and
  the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

According to a second aspect, the disclosure provides a liquid crystal display comprising:
  a set of devices for the liquid crystal display, each device including:
    a light directing portion for guiding light of a first wavelength range from a light source to a plurality of quantum dots, wherein the light directing portion includes a light directing branching; and
    the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
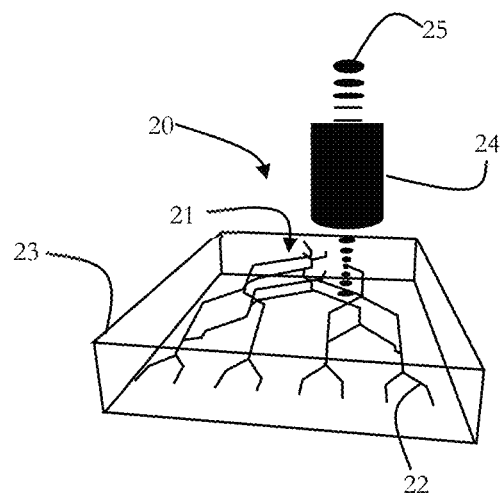
FIG. 2 depicts a light directing portion according to the present disclosure.

Before a detailed description of the embodiments starting with FIG. 2 is given, general explanations are made.

As mentioned in the outset, liquid crystal displays (LCDs) are generally known. Known LCDs may be based on a stacked design, as depicted in FIG. 1.

Figure 1:
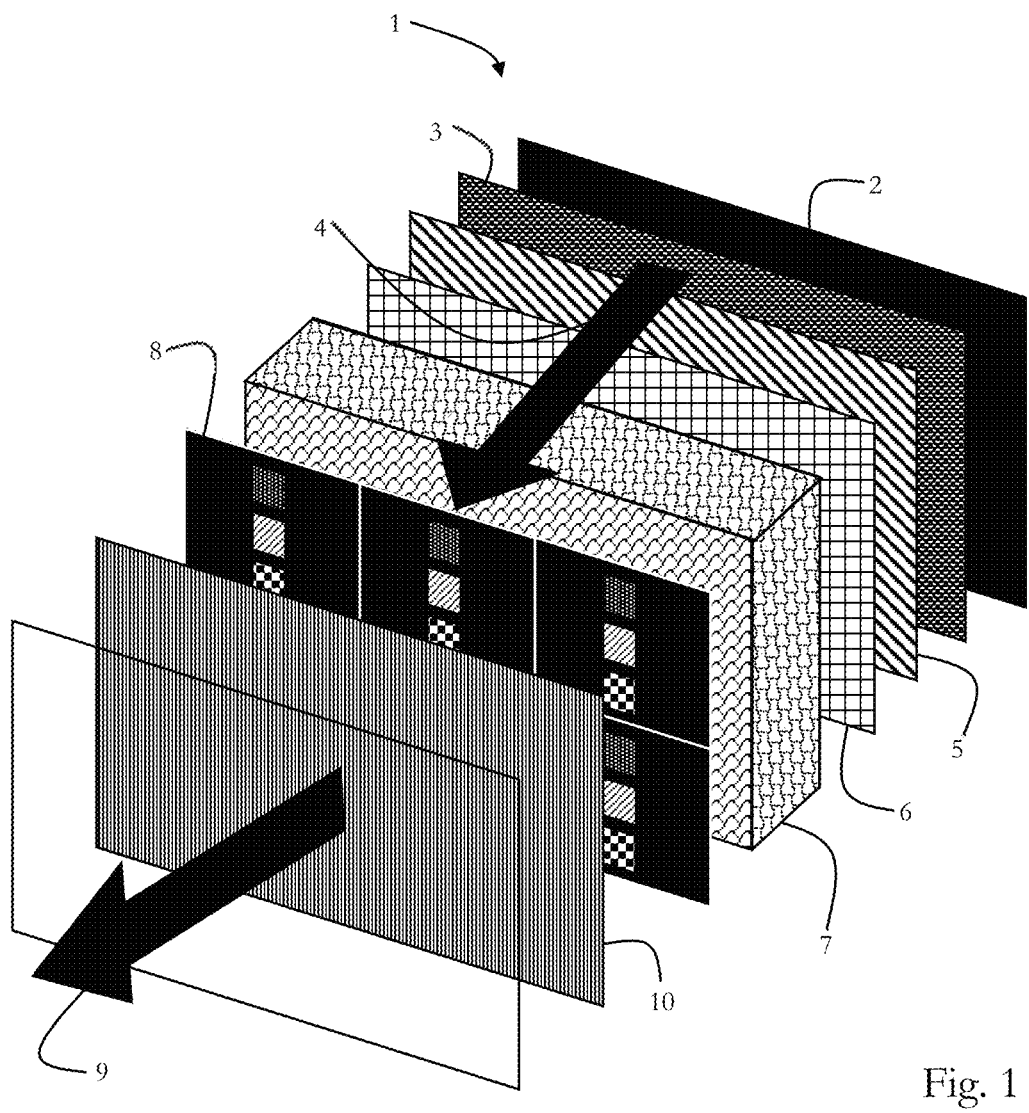
FIG. 1 depicts a known LCD stack design.

FIG. 1 depicts an LCD stack 1 including a backlight housing 2 and an LED (light emitting diode) backlight 3 in front of the backlight housing 2, wherein the LED backlight 3 is configured to emit white light 4. Furthermore, the LCD stack 1 includes a polarizer 5, a transparent TFT 6 and liquid crystal cells 7.

The white light is polarized by the polarizer 5. The transparent TFT 6 is adaptable such that it is transparent at regions at which the polarized light should be transmitted to the liquid crystal cells 7 and not transparent at regions at which the polarized light should not be transmitted to the liquid crystal cells 7 since a color (e.g. red, green, or blue) is displayed depending on which liquid crystal cell is irradiated.

In order to generate a color, the LCD stack 1 further has a plurality of color filters 8, which are passed by the light of the liquid crystal cells 7, which is in turn transformed to colored light 9.

After a further polarizer 10 which is arranged in front of the plurality of color filters 8, a glass front 11 is disposed.

It should be noted that FIG. 1 is an exploded view of the LCD stack 1 and the different layers may be directly in contact with each other, as it is generally known.

It has be recognized that known LCD stacks such as the LCD stack 1 of FIG. 1 may have a low efficiency, thereby having a high power consumption, whereas it is generally desirable to increase a power efficiency, increase a color gamut, and improve an image contrast.

It has further been recognized that, if a waveguide is used for delivering light to the pixels, each (sub-)pixel waveguide must be manufactured separately in order to distribute RGB laser light to corresponding subpixels, which may lead to a complex system design since for each sub-pixel a corresponding laser must be provided.

In other known systems, RGB laser diodes may be used as a white light source. However, it has been recognized that lasers and LEDs (light emitting diodes), which may be additionally used in the display, may have different emission characteristics. For example, a laser may have a smaller light-emitting area and a smaller divergence angle than an LED, such that it may be challenging to ensure uniform illumination without performing adequate diffusion.

Furthermore, it has been recognized that RGB laser diodes may have different efficiencies (e.g. a red diode may have another efficiency than a green diode). For example, for blue light, a GaN based laser diode may be used and for red or green light a VCSEL (vertical cavity surface emitting laser) may be used.

Hence, it has been recognized that only one type of laser diodes may be used in order to overcome issues deriving from different (laser/diode) efficiencies.

The light emitted from the one type of laser diodes can be converted into other light by quantum dots, which will be discussed further below.

Further, it has been recognized, in order to increase a power efficiency of an LCD, it may be sufficient to replace color filters with a quantum dot layer.

In known devices, color filters may be provided which extract red, green and blue light in order to generate a color by mixing these colors with different strengths. However, in order to do so, the backlight might need to have an unspecific spectrum with a predetermined intensity. For example, blue-emitting LEDs with a yellow color-converting phosphor such as Ce:YAG may be present in known devices and color reproducibility may be achieved by narrow passband filters.

However, this may lead to a high amount of unused light, which is filtered out at (sub-)pixels in order to create purer red/green/blue. Hence, it has been recognized that known devices may be considered inefficient in that regard (e.g. inefficient picture generation and thus decreased display brightness at an acceptable power consumption).

Hence, it has been further recognized, in order to increase a color reproducibility of a light source, a color purity of the light source may be improved, which has been recognized that it can be achieved with quantum dots.

Furthermore, it has been recognized that it is desirable to have a thinner LCD display, such that it is desirable to reduce the number of layers.

Therefore, some embodiments pertain to a device for a liquid crystal display, including: a light directing portion for guiding light of a first wavelength range from a light source to a plurality of quantum dots, wherein the light directing portion includes a light directing branching; and the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

A liquid crystal display may be used for displaying images, as it is generally known, and the device according to the present disclosure may be included in the liquid crystal display, thereby replacing at least one component of a known liquid crystal display, as will be described further below.

The device for the liquid crystal display may include a light directing portion, such as a waveguide, an optical fiber portion, and the like. The light directing portion may be adapted to guide light of a first wavelength range.

For example, the light directing portion may internally reflect the light of the first wavelength range, for example by total reflection, from one end of the light directing portion to another end of the light directing portion.

For example, the first wavelength range may be blue. In such embodiments, only blue emitting VCSELs may be used which result in a simpler design than in known devices which may have more laser diodes (e.g. red, green and blue laser diodes).

In some embodiments, the light is decoupled from the light directing portion as an evanescent light wave. In such embodiments, the light directing portion, which may include a plurality of light directing channels in a shape of a light directing branching (which will be discussed further below) is illuminated roughly orthogonal by the light source. For example, the light directing portion may have a cuboid shape, such that the largest surface of the cuboid may be illuminated, and the light directing branching may guide the light to one of the smaller surfaces of the cuboid for decoupling the light, or the like.

Hence, as already discussed, the light directing portion may include a light directing branching such as one or multiple paths, which, when light enters the light directing portion, distribute the light within the light directing portion.

The light directing branching may include one or multiple branches deriving from one or more main branches, or the like, such that from one main branch, the light may be distributed to multiple sub-branches. Hence, the light from a single light source may be distributed efficiently to multiple pixels, for example.

Generally, the present disclosure is not limited to any material of the light directing portion or any method for providing the light directing branching, although, in some embodiments, the light directing branching is inscribed into a TFT glass with an ultra-short laser pulse technique.

For decoupling the light from the light directing portion, at each point at which the light should be decoupled, a micro-structured mirror (i.e. a plurality of micro-structured mirrors) may be provided in the light directing portion. A number of the plurality of micro-structured mirrors may correspond to a number of pixels and/or a number of branches. However, the present disclosure is not limited to that since, depending on an arrangement of the branches, one mirror may be provided which decouples the light from multiple branches.

When the light of the first wavelength range passes the light directing portion, it may be directed to the plurality of quantum dots. The quantum dots may directly follow (in terms of a light path) after the light directing portion, or it may be envisaged that there is at least one more element between the light directing portion and the plurality of quantum dots.

Generally, quantum dots are known, which are, in some embodiments, semiconductor particles in the nanometer range. In comparison to (the same) semiconductor particles, which are larger than quantum dots, optical and electronic properties differ between the quantum dots and the larger particles. In a quantum dot, the motion of electrons and holes is confined by the bandgap structure of the semiconductor materials of which the quantum dot is composed, leading to discrete electronic states. Typically, quantum dots manufactured by colloidal synthesis have an optically active core and a protective layer formed on the core. The electronic states and, thus, the optical absorption and emission properties (e.g. absorption band, emission profile, emission peaks and corresponding emission wavelengths) can be controlled, in some embodiments, by the size of the core part and the protective layer and their material composition.

A brief introduction in the light absorption and emission process in semiconductor quantum dots is given in the following, which may be present in some embodiments. In semiconductor quantum dots, light absorption may lead to an electron being excited from the valence to the conduction band, leaving behind a hole. The electron and the hole, for example, can bind to each other to form an exciton. When this exciton recombines (i.e. the electron resumes its ground state), the exciton's energy may be emitted as light. Typically, this may be possible from a number of bounded exciton states such that a number of radiative transitions is possible. Moreover, other radiative transitions may be allowed in semiconductor quantum dots. Generally, each radiative transition is not restricted to a single wavelength due to broadening mechanisms such as at least natural broadening.

Hence, the probability that a certain wavelength is emitted (from a single quantum dot after absorption of incident light) may depend at least on the probability of the corresponding radiative transition of an electron and a hole and, thus, the optical power emitted by the plurality of quantum dots after excitation varies according to the emission profile in some embodiments. Accordingly, the emission profile may be understood as the integrated optical power recorded for a plurality of wavelengths in a wavelength range over a certain time interval, wherein the optical power is emitted by a plurality of quantum dots when light of (at least) a predetermined wavelength incident. In addition, production-related variations, for example, in the size of the quantum dots, may contribute to the emission profile and, accordingly, the emission profile may basically reflect an ensemble property of a plurality of quantum dots.

Typically, the emission profile of a material has at least one emission peak which may originate from the lowest radiative electronic state (optically allowed transition) and, as described above for the example of quantum dots, a continuum of wavelengths may be emitted, e.g. an emission peak, and each wavelength may be emitted with a certain probability. In some embodiments, the emission peak is present at a certain emission wavelength (e.g. a maximum of the peak, a certain wavelength in a wavelength interval characterizing the emission peak such as the full-width-at-half-maximum, or the like), which may correspond to the energy difference between the energy of the radiative state and the ground state (for example energy difference of the electron and hole state). In some embodiments, the emission wavelength corresponds to the wavelength at which a maximum of the emission peak is present (is recorded).

Typical materials for manufacturing quantum dots may include InGaAs, CdSe, GaInP, InP, and the like, without limiting the present disclosure in that regard.

In some embodiments, the quantum dots may include multishell quantum dots, such that a high conversion efficiency (i.e. a high quantum yield) may be achieved.

Furthermore, (multishell) quantum dots may have narrow emission properties (i.e. an emission band may be lower than thirty-five nanometers) and short fluorescence lifetimes (e.g. in a nanosecond range). Furthermore, multishell quantum dots may be thermally stable and photostable since they may have an active core which may be surrounded by one or more protecting layers and one or more dielectric layers such as $SiO_2$, $TiO_2$, $Al_2O_3$, ZnO, $NaYF_4$ (without limiting the present disclosure in that regard. Hence, a layered structure, as will be discussed further below with respect to FIGS. 7 and 8, may correspond to a layering of InP/ZnSe/ZnS/ZnO, wherein InP may correspond to the active core, ZnSe and ZnS may correspond to the protecting layers and ZnO may correspond to the dielectric layer. In another example, a multishell quantum dot may be based on a layering of CdSe/CdS/$TiO_2$, wherein CdSe may correspond to the active core, CdS may correspond to the protecting layer and $TiO_2$ may correspond to the dielectric layer.

According to the present disclosure, due to providing the light directing portion, a higher efficiency is achieved since a loss (and therefore unused light) within the light directing branching may be considered as close to or equal to zero.

Furthermore, the efficiency is increased since only one first wavelength is needed (e.g. due to using blue emitting VCSELs).

Furthermore, an LCD efficiency is increased due to using polarized (e.g. blue, ultraviolet, etc.) laser light and thus, a polarizer may be omitted. Furthermore, the LCD efficiency is increased due to an omission of a color filter.

Since quantum dots are used according to the present disclosure, a higher color gamut than in known LCDs may be achieved.

In total, a more cost efficient and thinner LCD stack design may be achieved according to the present disclosure by providing the light directing portion (e.g. by incorporating a laser waveguide (light directing branching) into a TFT glass) and by using quantum dots.

The plurality of quantum dots may be configured to emit light of a second wavelength range in response to an absorption of the light of the first wavelength range.

In particular, the device may include a plurality of display elements (e.g. pixels), wherein each display element may include a subset of the plurality of quantum dots (e.g. two). In such embodiments, not each quantum dot of the plurality of quantum dots may emit light of the second wavelength range.

For example, each display element may generally be configured to display three colors, e.g. red, green, and blue. The light of the first wavelength range may represent a blue color range. The light directing branching may have three openings for each display element, such that light of the first wavelength range can be guided to a quantum dot of a first type, which may emit red light (as the second wavelength range), and/or to a quantum dot of a second type, which may emit green light (as a third wavelength range). Moreover, the third opening may guide light of the first wavelength range to a transparent part of the display element, such that the display element ultimately displays the three colors, two of them due to transformation, and one of them by letting it pass.

However, the present disclosure is not limited to such an embodiment since a display element may only display one color (of the second wavelength range), or no color at all, if the light of the second wavelength range lies within an infrared or ultraviolet spectrum, or the like.

The quantum dot pattern may correspond to the light directing branching, as has already been discussed, such that each quantum dot may be illuminated based on one light source whose light is distributed by the light directing branching.

In some embodiments, the first wavelength range represents a blue color range, as discussed herein.

In some embodiments, each display element includes a quantum dot of a first type configured to emit the light of the second wavelength range and a quantum dot of a second type configured to emit light of a third wavelength range, as discussed herein.

In some embodiments, the second wavelength range represents a red color range and wherein the third wavelength range represents a green color range, or vice versa, i.e. the second wavelength range represents a green color range and the third wavelength range represents a red wavelength range.

Generally, the present disclosure is not limited to any wavelength or color range, as will be appreciated by the skilled person. For example, the second wavelength range may include a yellow color range or a wavelength range which includes several color ranges, infrared light, and/or the like.

In some embodiments, the first wavelength range includes an ultraviolet wavelength range.

In such embodiments, if the display element is adapted to emit for example light of the color red, green, and blue, the light directing portion may be adapted to guide the light of the first wavelength range to respective three quantum dots in each display element.

Hence, in some embodiments, each display element includes a quantum dot of a first type, configured to emit light of the second wavelength range, a quantum dot of a second type configured to emit light of a third wavelength range and a quantum dot of a third type configured to emit light of a fourth wavelength range.

In some embodiments, the second wavelength range represents a red color range, the third wavelength range represents a green color range, and the fourth wavelength range represents a blue color range, without limiting the present disclosure to any color range, as already discussed above.

Moreover, it should be noted that the present disclosure is not limited to the case that each display element is configured to emit the same wavelength ranges. For example, a first display element may be configured to emit red and green light only and a second display element may be configured to emit yellow light and blue light (e.g. by letting through blue light, if it is included in the first wavelength range), or the like.

In some embodiments, the light source includes a laser.

Generally, any laser may be envisaged, such as a diode laser, a solid-state laser, a gas laser, a free electron laser, a dye laser, and the like.

As already discussed, it may be sufficient to only use one laser since the light directing portion may distribute a laser beam onto each display element, without limiting the present disclosure in that regard.

For example, in order to fulfill safety requirements, more than one laser may be envisaged, wherein the branching of the light directing portion may be adapted accordingly to provide multiple entries for the multiple laser, as may be understood by the person skilled in the art.

In some embodiments, the laser includes a vertical cavity surface emitting laser (VCSEL).

VCSELs are generally known, and may be utilized, in some embodiments, due to their efficiency in providing the first wavelength range, for example.

Moreover, VCSELs may be adaptable to a light directing portion according to the present disclosure due to their design, which may allow to couple the light of the first wavelength range into the light directing portion without sacrificing much space of the liquid crystal display.

Some embodiments pertain to a liquid crystal display including: a set of devices for the liquid crystal display, each device including: a light directing portion for guiding light of a first wavelength range from a light source to a plurality of quantum dots, wherein the light directing portion includes a light directing branching; and the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

Hence, for each liquid crystal display, several devices may be envisaged. For example, in the simplified case of each branching being adapted to illuminate thirty-two display elements (i.e. thirty-two pixel rows are at hand), a 4K resolution of the liquid crystal display may be achieved by including one hundred and twenty-eight devices for the liquid crystal display (and also one hundred and twenty-eight VCSELs, for example).

In some embodiments, the liquid crystal display further includes a light directing layer including the set of light directing portions; and a quantum dot layer including the plurality of quantum dots.

For example, the liquid crystal display may have a layered structure. Hence, there may be provided the light directing layer as a first layer and the quantum dot layer as a second layer. It should be noted that in view of the present disclosure, additional layers may be envisaged, but not necessarily needed, which will be discussed further below.

In some embodiments, the liquid crystal display may further include a glass layer including the light directing layer.

For example, in the glass layer, multiple sub-layers may be included, such as the light directing layer. Moreover, it may be envisaged that a thin film transistor layer may be included in the glass layer. Hence, in some embodiments, the glass layer further includes a thin film transistor layer.

However, in some embodiments, the thin film transistor layer and the light directing layer may be distinct layers, such that, in some embodiments, the liquid crystal display further includes a thin film transistor layer.

In some embodiments, the liquid crystal display, further includes a liquid crystal layer. The liquid crystal layer may include a plurality of liquid crystal cells corresponding to the whole of the plurality of quantum dots for further directing the light of the first wavelength, e.g. due to an anisotropic behavior of the liquid crystal cells, as it is generally known.

In some embodiments, the liquid crystal layer is disposed between the light directing layer and the quantum dot layer, such that possible scattered/stray light from the light directing portion may be filtered out by the liquid crystal layer.

Returning to FIG. 2, there is depicted a light directing portion 20 according to the present disclosure. The light directing portion has a light directing branching 21, such that a plurality of light channels 22 is formed in the light directing branching 21.

The light directing portion further includes a TFT glass 23 in which the light directing branching is inscribed (as will be discussed under reference of FIG. 3).

FIG. 2 further depicts a lens 24 which, when irradiated by light 25, is configured to focus the light on the light directing branching 21.

Figure 3:
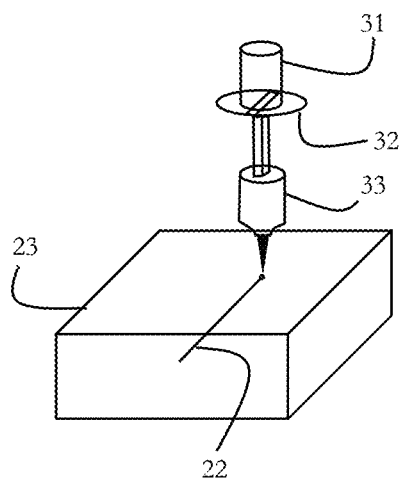
FIG. 3 depicts an illustration of a laser inscribing method for manufacturing the light directing portion of FIG. 2.

FIG. 3 depicts an illustration of a laser inscribing method for manufacturing the light directing portion 20 of FIG. 2.

The TFT glass 23 is irradiated with an ultra-short light pulse 31 ("fs-pulse"; on a femtosecond scale), which is first transmitted through a slit 32, thereby resulting in a rectangular shape of the ultra-short light pulse 32. Then, the ultra-short light pulse 31 is transmitted through an aspheric lens 33, which focuses the ultra-short light pulse 31 on a position of the TFT glass 23 in which a light channel 22 is to be inscribed.

Figure 4:
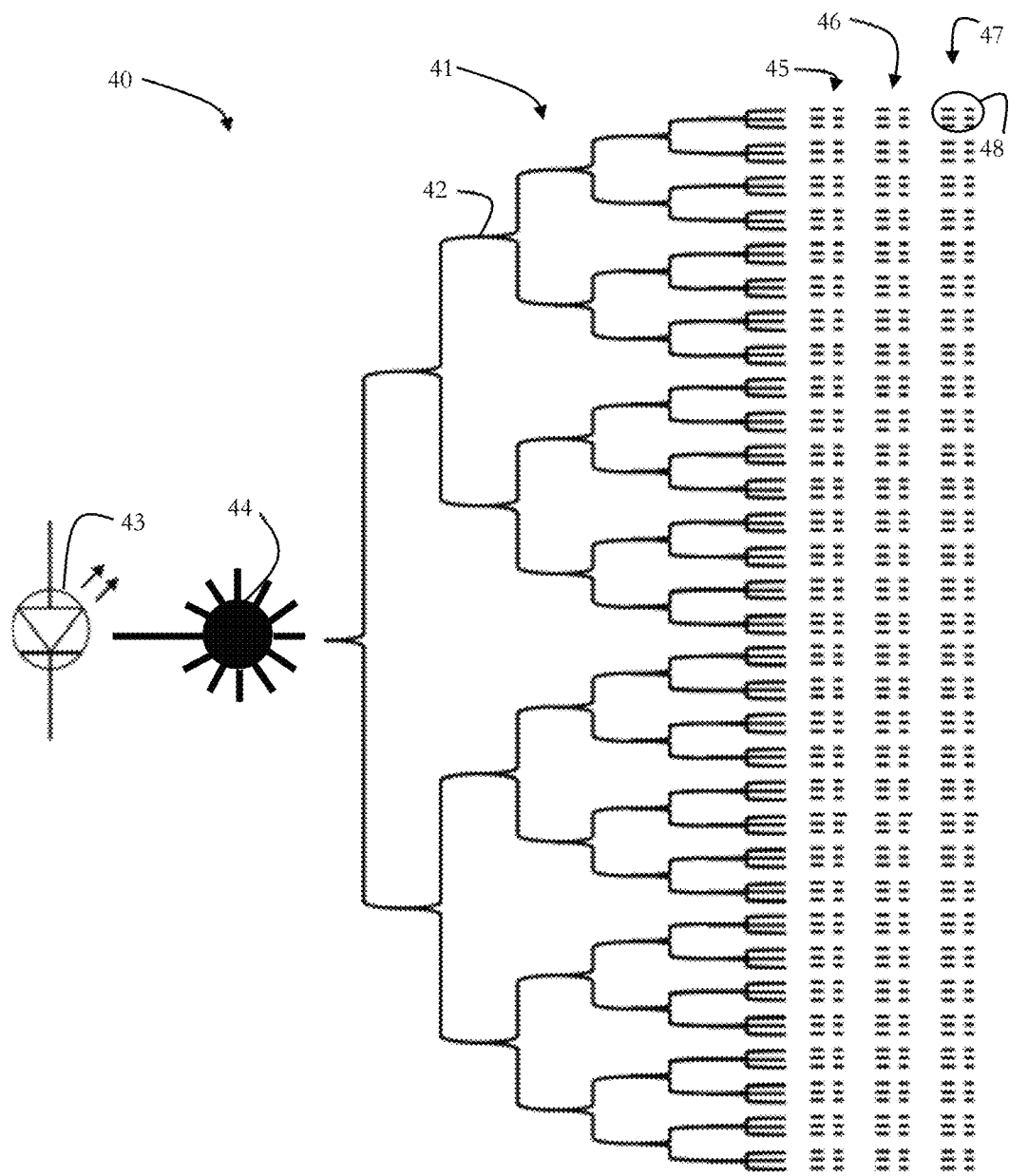
FIG. 4 is a schematic illustration of a device for an LCD according to the present disclosure.

FIG. 4 is a schematic illustration of a device 40 for a liquid crystal display according to the present disclosure. The device 40 includes a light directing portion 41 which is established by a light directing branching 42 embedded into a TFT glass (not shown).

The device 40 further includes a VCSEL 43 which is configured to emit polarized blue light 44.

The light 44 enters the light directing branching 42 and gets distributed through branches of the light directing branching 42 onto liquid crystal cells 45, which are arranged as a layer after the light directing portion 41. After the liquid crystal cells 45, a polarizer 46 is arranged, and thereafter a quantum dot layer 47 is arranged.

The quantum dot layer is configured to transform polarized blue light into either green, blue, or red light (or only in green or red light since the blue light would not necessarily be needed to be converted).

Hence, the quantum dot layer 47 has a plurality of pixels 48, each having three sub-pixels, a red sub-pixel, a green sub-pixel, and a blue sub-pixel.

Through the blue sub-pixel, a blue light is being transmitted. The red sub-pixel is configured to transform the blue polarized light into red light. The green sub-pixel is configured to transform the blue polarized light into green light. For this purpose, the green sub-pixel and the red sub-pixel include different quantum dot structures, which will be explained further below.

According to the present disclosure and to the embodiment of FIG. 4, an overall LCD design is simpler and more efficient than a known LCD since for each light directing portion, only one VCSEL may be needed. Furthermore, the efficiency is increased by incorporating the quantum dots.

Since the light directing branching is used, the generated blue laser light can be directed to every sub-pixel with a minimum amount (e.g. zero) of loss.

In the embodiment of FIG. 4, six main branches are shown, resulting in thirty-two pixel rows with three sub-pixels. For achieving a 4K display resolution (with 4096 lines), one-hundred and twenty-eight VCSELs are needed.

For example, if the LCD is used in a fifty-five inch TV display (121.7 cm width and 68.8 cm height, for example), the VCSELs can be distributed on both sides of the display, resulting in sixty-four VCSELs on each vertical side.

In such an embodiment, a pitch of 1.07 cm may be present between two VCSELs.

When the VCSELs are distributed both vertical and horizontal sides, they can be distributed equally around the whole display.

If more branches are provided in the branching, the overall amount of needed VCSELs can be further reduced. For example, by providing eight main branches, one-hundred and twenty-eight pixels (i.e. three-hundred and eighty-four sub-pixels), in which case sixteen VCSELs may be needed on each vertical side.

It should be noted that the size ratios of the structures shown in FIG. 4 are chosen for illustrational purposes only. Furthermore, in the present embodiment, the device only includes one VCSEL, one light directing portion, and so on. However, according the present disclosure a plurality of these elements may be envisaged. Furthermore, the light directing branching may have more or less branches. The number of VCSELs may be changed, as well. For example, two or more VCSELs may be envisaged for irradiating one light directing portion.

It should also be noted that the present disclosure is not limited to blue light which is being transformed since also light of a higher energy or lower may be envisaged, depending on the specific use-case.

For example, ultra-violet light may be emitted by a light source (the present disclosure is not limited to VCSELs), which may be transformed into blue, red and green light. In this case, the blue sub-pixel may include a quantum dot structure and not just leave the go through.

Furthermore, also when blue light is being emitted by the light source, the blue sub-pixel may need to transform the blue light into a different shade of blue, in which case also a quantum dot structure may be envisaged in the blue sub-pixel.

Figure 5:
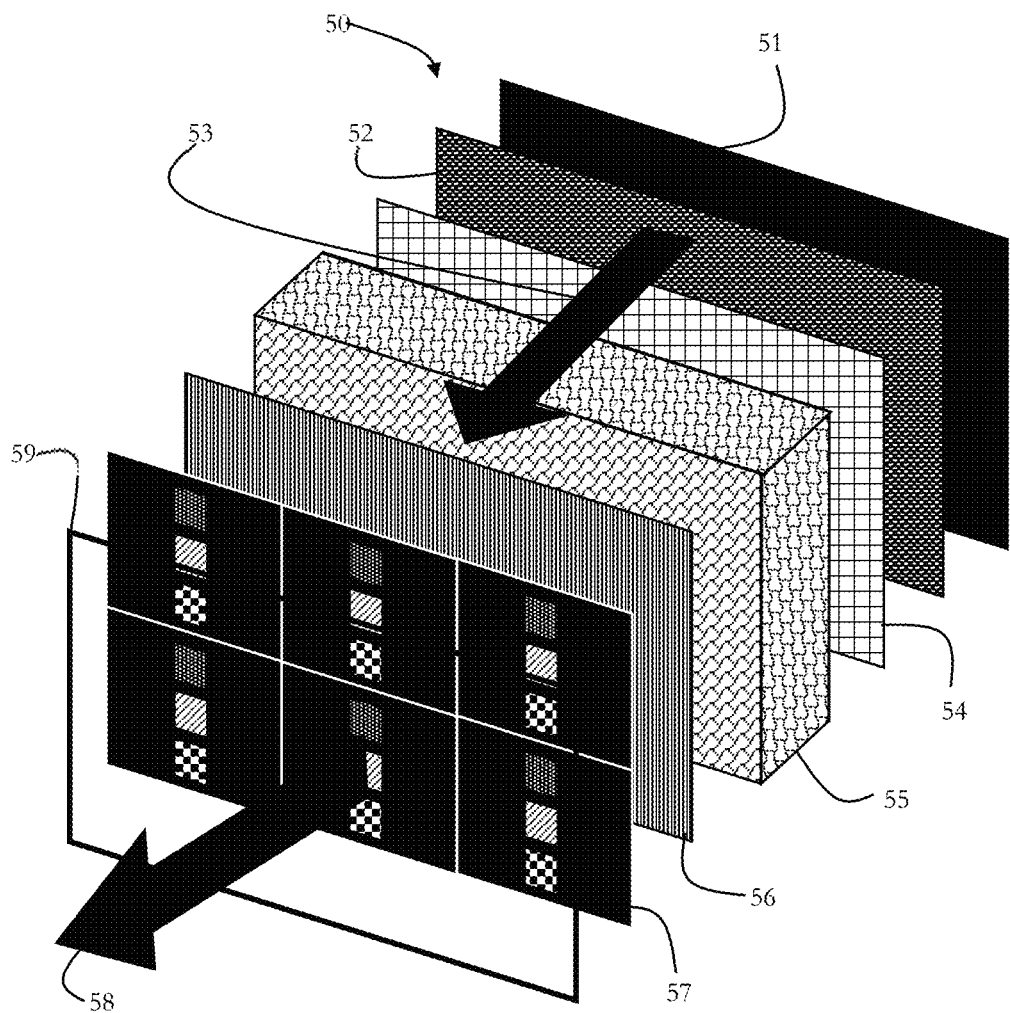
FIG. 5 depicts a schematic view of an embodiment of an LCD according to the present disclosure.

FIG. 5 depicts a schematic view of an embodiment of a liquid crystal display (LCD) 50 according to the present disclosure.

The liquid crystal display 50 includes different layers, wherein the layers shown herein may be sufficient to provide a liquid crystal display, but should not be construed as limiting or binding.

The liquid crystal display 50 includes a backlight housing 51 after which a polarized laser backlight 52 is arranged. The polarized laser backlight 52 is configured to emit blue polarized light 53. After the polarized laser backlight 52, a transparent TFT 54 is arranged which is configured to be transparent at positions such that predetermined liquid crystal cells of a liquid crystal cell layer 55 should get excited.

After the liquid crystal cell layer 55, a polarizer 56 is arranged. After the polarizer 56, a quantum dot color converter layer 57 is arranged which includes a plurality of pixels each including three sub-pixels (red, green and blue, each marked with different hachures), such that RGB light 58 is being emitted from the liquid crystal display 50.

Furthermore, the LCD 50 includes a glass front 59.

As it is the case for FIG. 1, it should be noted that FIG. 5 shows an exploded view of the LCD 50 and the layer may be provided in contact with each other, as it is generally known.

In contrast to the known LCD of FIG. 1, the LCD 50 of FIG. 5 does not need the first polarizer since the laser backlight already emits polarized light. Thereby, the LCD 50 may be manufactured thinner than the LCD 1 of FIG. 1.

Figure 6:
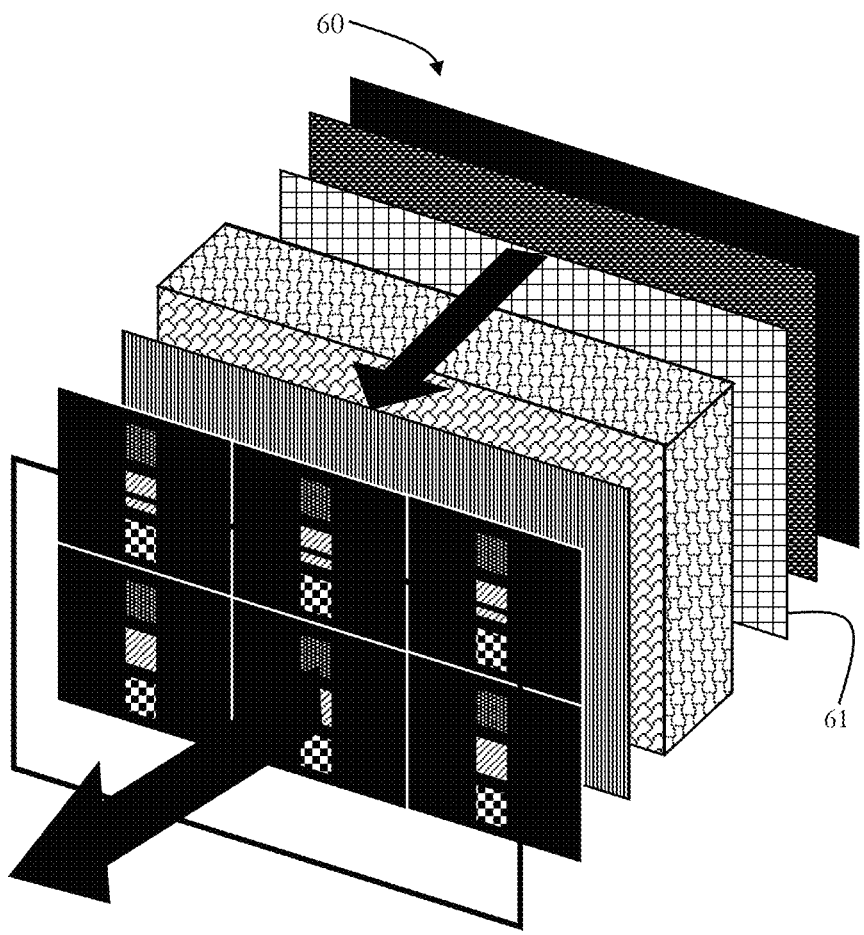
FIG. 6 depicts a further embodiment of an LCD according to the present disclosure.

FIG. 6 depicts a further exploded view of an LCD 60 according to the present disclosure. The LCD 60 is different from the LCD 50 in that a light directing portion 61 (as discussed herein) the transparent TFT 54. The light directing portion has a light directing branching in a TFT glass, as discussed herein.

According to this embodiment, the LCD can be made more power efficient, cost efficient and thinner due to providing the light directing portion 61 inside the TFT glass.

As it is the case for FIGS. 1 and 5, it should be noted that FIG. 6 shows an exploded view of the LCD 50 and the layer may be provided in contact with each other, as it is generally known.

Figure 7:
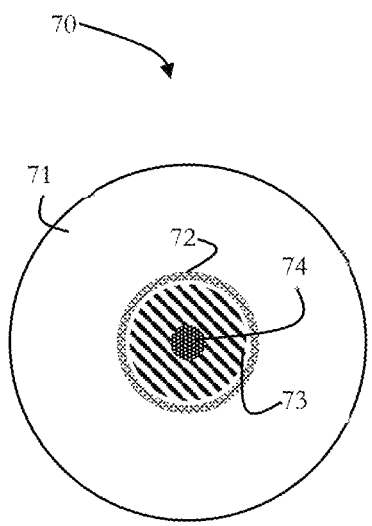
FIG. 7 depicts a schematic illustration of an Indium based quantum dot according to the present disclosure.

FIG. 7 depicts a schematic illustration of an embodiment of an Indium based quantum dot 70 according to the present disclosure.

The quantum dot 70 includes layers of different materials. A first, outmost layer 71 includes a mixture of InP/ZnSe/ZnS/ZnO. The outmost layer 71 has a thickness of approximately eight to twelve nanometers. Furthermore, a second layer 72, which is surrounded by the first layer 71, includes a mixture of InP/ZnSe/ZnS. A third layer 73, which is surrounded by the first and the second layers includes a mixture of InP/ZnSe and has a thickness of approximately three nanometers.

A fourth, innermost layer 74, which is surrounded by the other layers 71 to 73, includes InP. In total, the quantum dot 70 has a thickness of at least or more than twenty-eight nanometers.

As generally known, In, P, Zn, Se, S, and O refer to chemical elements.

Figure 8:
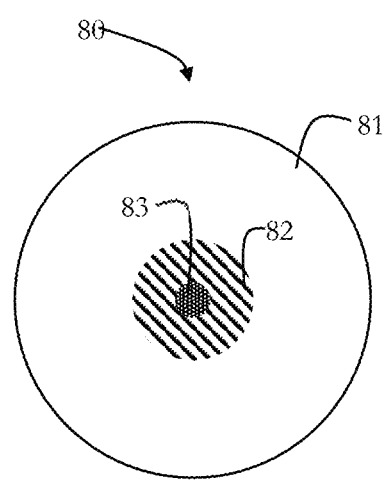
FIG. 8 depicts a schematic illustration of a Cadmium based quantum dot according to the present disclosure.

FIG. 8 depicts a schematic illustration of an embodiment of a Cadmium based quantum dot 80 according to the present disclosure.

A first, outmost layer 81 includes CdSe/CdS/TiO$_2$ and has a thickness of approximately thirteen to fifteen nanometers. A second layer 82, surrounded by the first layer, includes CdSe/CdS and has a thickness of approximately three nanometers. A third, innermost layer 83, includes CdSe.

In total, the quantum dot 80 has a thickness of at least or more than thirty-three nanometers.

As generally known, Cd, Se, S, Ti, and O refer to chemical elements.

Note that the present technology can also be configured as described below.

(1) A device for a liquid crystal display, comprising:
  a light directing portion for guiding light of a first wavelength range from a light source to a plurality of quantum dots, wherein the light directing portion includes a light directing branching; and
  the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

(2) The device of (1), wherein the first wavelength range represents a blue color range.

(3) The device of (2), wherein each display element includes a quantum dot of a first type configured to emit the light of the second wavelength range and a quantum dot of a second type configured to emit light of a third wavelength range.

(4) The device of (3), wherein the second wavelength range represents a red color range and wherein the third wavelength range represents a green color range.

(5) The device of (1), wherein the first wavelength range includes an ultraviolet wavelength range.

(6) The device of (5), wherein each display element includes a quantum dot of a first type, configured to emit light of the second wavelength range, a quantum dot of a second type configured to emit light of a third wavelength range and a quantum dot of a third type configured to emit light of a fourth wavelength range (7) The device of (6), wherein the second wavelength range represents a red color range, wherein the third wavelength range represents a green color range, and wherein the fourth wavelength range represents a blue color range.

(8) The device of anyone of (1) to (7), wherein the light source includes a laser.

(9) The device of (8), wherein the laser includes a vertical cavity surface emitting laser.

(10) A liquid crystal display comprising:
  a set of devices for the liquid crystal display, each device including:
    a light directing portion for guiding light of a first wavelength range from a light source to a plurality of quantum dots, wherein the light directing portion includes a light directing branching; and
    the plurality of quantum dots configured to emit light of a second wavelength range in response to light of the first wavelength range being incident on a plurality of display elements, each display element including a subset of the plurality of quantum dots, thereby defining a predetermined quantum dot pattern corresponding to the light directing branching.

(11) The liquid crystal display of (10), further comprising:
a light directing layer including the set of light directing portions; and
a quantum dot layer including the plurality of quantum dots.

(12) The liquid crystal display of (11), further comprising a glass layer including the light directing layer.

(13) The liquid crystal display of (12), wherein the glass layer further includes a thin film transistor layer.

(14) The liquid crystal display of anyone of (10) to (13), further including a thin film transistor layer.

(15) The liquid crystal display anyone of (10) to (14), further including a liquid crystal layer.

(16) The liquid crystal display of (15), wherein the liquid crystal layer is disposed between the light directing layer and the quantum dot layer.

The invention claimed is:

1. A device for a liquid crystal display, comprising:
  a light directing portion to guide light of a first wavelength range from a light source to a plurality of quantum dots, wherein the light directing portion includes light directing branching channels such that each of the plurality of quantum dots receives light from and terminates a different one of the light directing branching channels such that no light directing channel extends past each of the plurality of quantum dots on a side of each of the plurality of quantum dots opposite the light source; and
  the plurality of quantum dots configured to emit light of a second wavelength range in response to light of the first wavelength range being incident on a plurality of display elements, each display element including a subset of the plurality of quantum dots arranged in a predetermined quantum dot pattern corresponding to the light directing branching channels.

2. The device of claim 1, wherein the first wavelength range represents a blue color range.

3. The device of claim 2, wherein each display element includes a quantum dot of a first type configured to emit the light of the second wavelength range and a quantum dot of a second type configured to emit light of a third wavelength range.

4. The device of claim 3, wherein the second wavelength range represents a red color range and wherein the third wavelength range represents a green color range.

5. The device of claim 1, wherein the first wavelength range includes an ultraviolet wavelength range.

6. The device of claim 5, wherein each display element includes a quantum dot of a first type, configured to emit light of the second wavelength range, a quantum dot of a second type configured to emit light of a third wavelength range and a quantum dot of a third type configured to emit light of a fourth wavelength range.

7. The device of claim 6, wherein the second wavelength range represents a red color range, wherein the third wavelength range represents a green color range, and wherein the fourth wavelength range represents a blue color range.

8. The device of claim 1, wherein the light source includes a laser.

9. The device of claim 8, wherein the laser includes a vertical cavity surface emitting laser.

10. A liquid crystal display comprising:
  a set of devices for the liquid crystal display, each device including:
    a light directing portion to guide light of a first wavelength range from a light source to a plurality of quantum dots, wherein the light directing portion includes light directing branching channels such that each of the plurality of quantum dots receives light from and terminates a different one of the light directing branching channels such that no light directing channel extends past each of the plurality of quantum dots on a side of each of the plurality of quantum dots opposite the light source; and the plurality of quantum dots configured to emit light of a second wavelength range in response to light of the first wavelength range being incident on a plurality of display elements, each display element including a subset of the plurality of quantum dots arranged in a predetermined quantum dot pattern corresponding to the light directing branching channels.

11. The liquid crystal display of claim 10, further comprising:
   a light directing layer including the set of light directing portions; and
   a quantum dot layer including the plurality of quantum dots.

12. The liquid crystal display of claim 11, further comprising a glass layer including the light directing layer.

13. The liquid crystal display of claim 12, wherein the glass layer further includes a thin film transistor layer.

14. The liquid crystal display of claim 10, further comprising a thin film transistor layer.

15. The liquid crystal display of claim 10, further comprising a liquid crystal layer.

16. The liquid crystal display of claim 15, wherein the liquid crystal layer is disposed between the light directing layer and the quantum dot layer.

17. The device of claim 1, wherein the light directing portion includes a lens to direct light onto the light directing branching channels.

18. The device of claim 1, wherein the predetermined quantum dot pattern includes patterns of a plurality of pixels each corresponding to a different color.

19. The device of claim 18, wherein the different colors include red, green, and blue.

20. The device of claim 1, wherein the quantum dots include mixtures of InP, ZnSe, ZnS, and ZnO.

* * * * *